United States Patent
Ono

(10) Patent No.: US 6,765,523 B2
(45) Date of Patent: Jul. 20, 2004

(54) STATIONARY OBJECT DETECTION METHOD FOR USE WITH SCANNING RADAR

(75) Inventor: Daisaku Ono, Kobe (JP)

(73) Assignee: Fujitsu Ten Limited, Hyogo (JP)

( * ) Notice: Subject to any disclaimer, the term of this patent is extended or adjusted under 35 U.S.C. 154(b) by 156 days.

(21) Appl. No.: 10/182,086

(22) PCT Filed: Dec. 27, 2001

(86) PCT No.: PCT/JP01/11599
§ 371 (c)(1),
(2), (4) Date: Jul. 24, 2002

(87) PCT Pub. No.: WO02/054108
PCT Pub. Date: Jul. 11, 2002

(65) Prior Publication Data
US 2003/0001771 A1 Jan. 2, 2003

(30) Foreign Application Priority Data
Dec. 28, 2000 (JP) ................................ 2000-402236

(51) Int. Cl.[7] .......................... G01S 13/93; G01S 13/32
(52) U.S. Cl. .......................... 342/70; 342/27; 342/28; 342/89; 342/90; 342/104; 342/109; 342/118; 342/128; 342/175; 342/195; 701/300; 701/301
(58) Field of Search .......................... 342/27, 28, 70, 342/71, 72, 89, 90, 175, 189–197, 118, 128, 129–147, 157, 158, 104–115; 701/300, 301

(56) References Cited

U.S. PATENT DOCUMENTS

| | | | |
|---|---|---|---|
| 5,210,772 A | * 5/1993 | Nakagawa | ............ 342/27 |
| 6,072,422 A | 6/2000 | Yamada | |
| 6,140,954 A | 10/2000 | Sugawara et al. | |

FOREIGN PATENT DOCUMENTS

| | | |
|---|---|---|
| DE | 199 59 398 A1 | 6/2000 |
| DE | 199 42 665 A1 | 7/2000 |
| EP | 0 932 052 A2 | 7/1999 |
| EP | 0 981 059 A2 | 2/2000 |
| JP | 7-98375 A | 4/1995 |
| JP | 11-183601 A | 7/1999 |
| JP | 11211811 A | 8/1999 |
| JP | 11-337635 A | 12/1999 |
| JP | 2000065921 A | 3/2000 |
| JP | 2000081480 A | 3/2000 |
| JP | 2000147102 A | 5/2000 |
| JP | 2000180540 A | 6/2000 |

OTHER PUBLICATIONS

International Search Report of PCT/JP01/11599, dated Jan. 29, 2002.

* cited by examiner

Primary Examiner—Bernarr E. Gregory
(74) Attorney, Agent, or Firm—Christie, Parker & Hale, LLP

(57) ABSTRACT

A stationary object detection method for a scanning radar wherein, of peaks generated based on a radar signal reflected from a target, peaks having substantially the same frequency are grouped together, and a decision is made as to whether or not the frequency of the grouped peaks is equal to/higher than a predetermined value, and wherein if the peak frequency is equal to or higher than the predetermined value, then a decision is made as to whether or not the number of grouped peaks is equal to or greater than a predetermined number and, if the number of peaks is equal to or greater than the predetermined number, it is decided that the target is an overhead bridge candidate or an overhead bridge. Further, pairing is applied to peaks signals obtained from the target determined as the overhead bridge candidate, to detect a relative velocity with respect to the target, and if the relative velocity is substantially equal to the speed of a vehicle equipped with the radar, it is decided that the target is an overhead bridge.

5 Claims, 8 Drawing Sheets

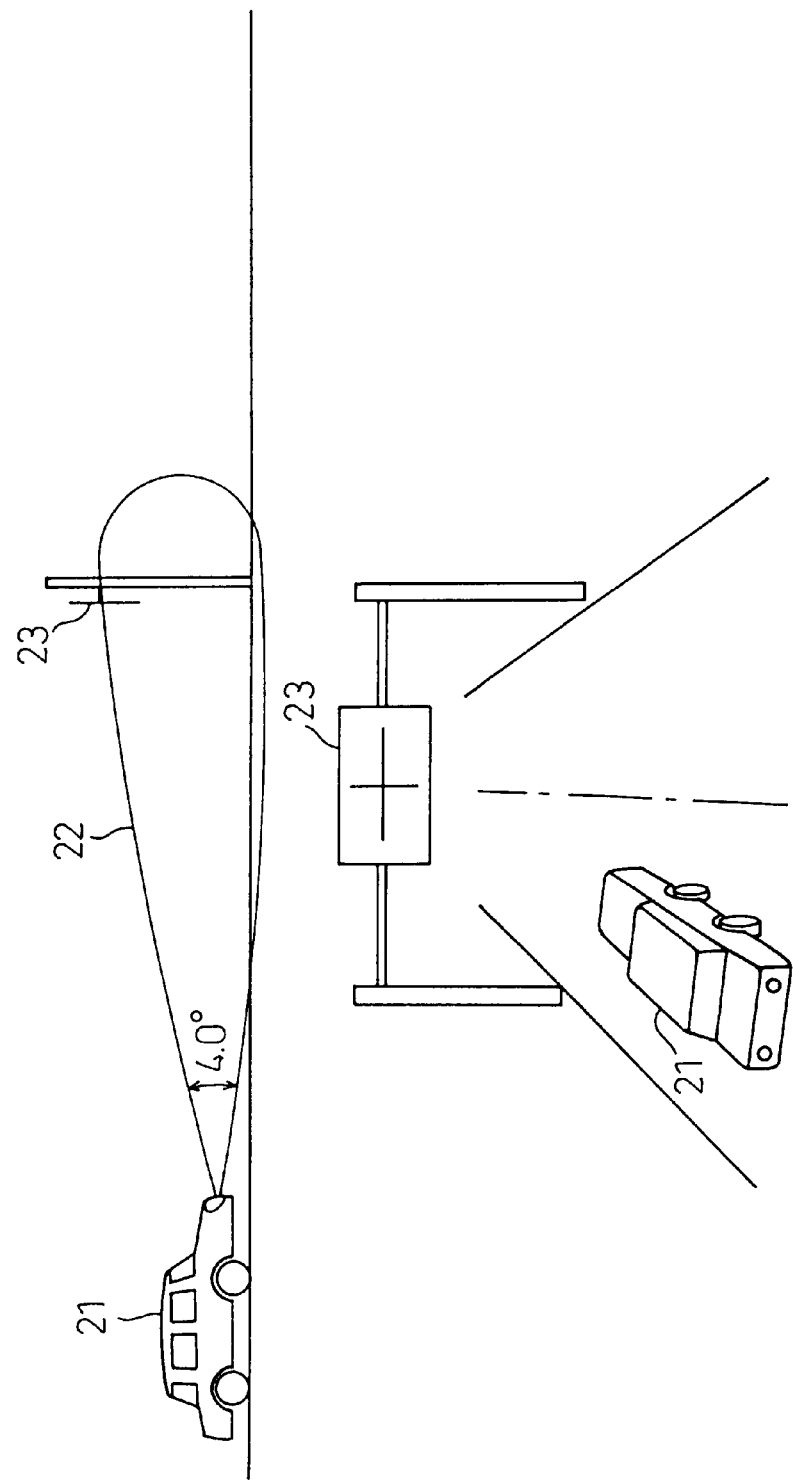

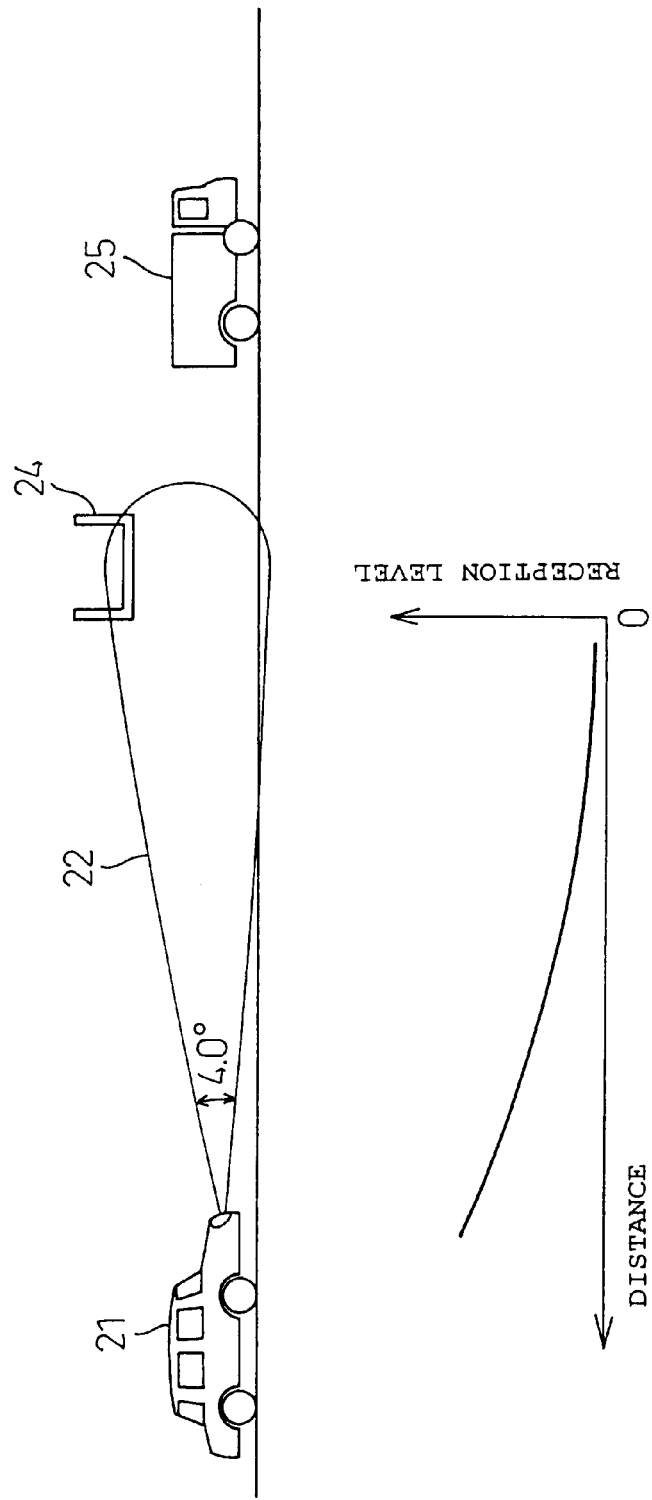

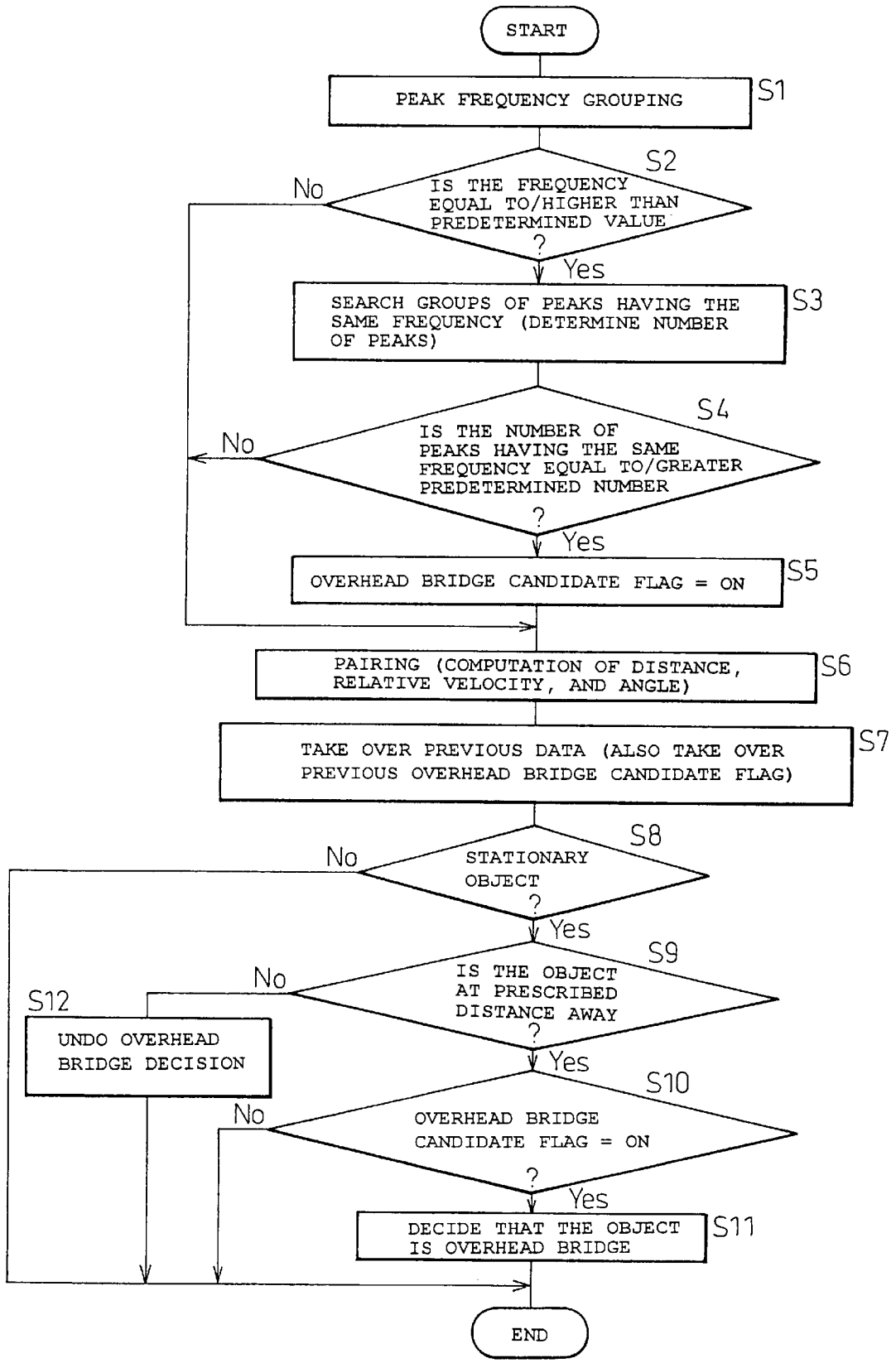

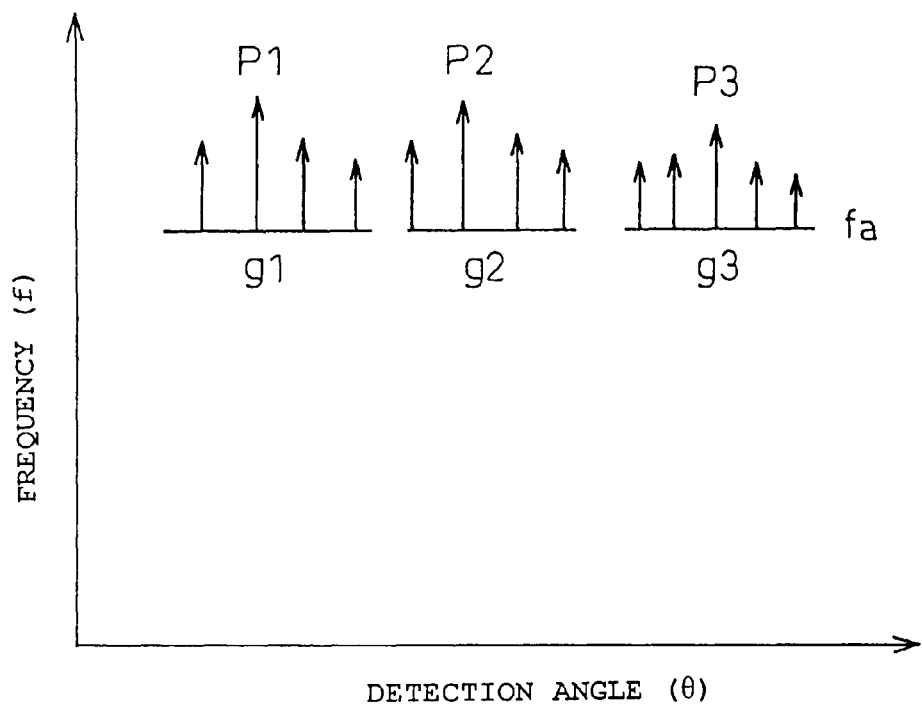

STATIONARY OBJECT DETECTION METHOD FOR USE WITH SCANNING RADAR

CROSS-REFERENCE TO RELATED APPLICATION

This application is a national phase application of International application number PCT/JP01/11599, filed on Dec. 27, 2001, which claims priority of Japanese application number 2000-402236, filed Dec. 28, 2000.

TECHNICAL FIELD

The present invention relates to a method, for use with a scanning radar, for detecting a stationary object such as a bridge, a road sign, a billboard, or the like located above the road ahead or on the roadside.

BACKGROUND ART

For vehicle-to-vehicle distance control, a vehicle-mounted radar system is used which projects a radar beam forward and thereby detects an object such as a vehicle located in the path ahead. Such radar systems include systems that use radio waves such as millimeter waves and systems that use laser light. Using such a radar system, the distance and relative velocity with respect to the vehicle ahead and the accurate position of the vehicle ahead are detected to control the vehicle-to-vehicle distance.

A scanning radar scans a radar beam by moving the beam from left to right or from right to left with small step angles within a predetermined time. At each step angle, the radar-equipped vehicle projects a radar beam toward the vehicle traveling on the road ahead, and the reflected wave from the vehicle ahead is received and processed to detect the presence of the vehicle ahead and compute the distance and relative velocity with respect to that vehicle.

However, in the case of conventional scanning radar, for example, FM-CW radar, the vertical beam width of an antenna transmitting a radar signal is about 4.0 degrees. As a result, a structure such as a road sign located far away from the radar-equipped vehicle or a bridge located above the road ahead may also be detected as a target object in vehicle-to-vehicle control, etc. because such structures cannot be distinguished from obstacles such as a vehicle stopped on the road ahead or a structure placed on the road for construction work.

DISCLOSURE OF THE INVENTION

It is an object of the present invention to provide a method for distinguishing a stationary object, such as a road sign, a billboard, a bridge, or like structure located above the road ahead or on the roadside, from a vehicle located in the path of a radar-equipped vehicle.

According to a stationary object detection method for a scanning radar pursuant to the present invention, of the peaks generated based on a radar signal reflected from a target, peaks having substantially the same frequency are grouped together. If the target is a bridge or a road sign, the target is not detected unless it is located at some distance away from the radar-equipped vehicle; in view of this, first a decision is made as to whether or not the frequency of the grouped peaks is equal to/higher than a predetermined value, that is, whether or not the distance to the target is equal to/greater than a predetermined value. If it is equal to/greater than the predetermined value, then a decision is made as to whether or not the number of grouped peaks is equal to/greater than a predetermined number. In the case of a bridge or a road sign, since the structure usually has a horizontally spreading shape, many peaks are detected, with the peaks distributed over a wide angle range. Accordingly, if the number of peaks is equal to/greater than the predetermined number, it is decided that the target is an overhead bridge candidate or an overhead bridge, that is, a bridge, a road sign, a billboard, or like structure located above the road ahead or on the roadside ahead.

Then, pairing is applied to peaks signals obtained from the target determined as the overhead bridge candidate, to detect a relative velocity with respect to the target, and if the relative velocity is substantially equal to the speed of the radar-equipped vehicle, it is decided that the target is an overhead bridge.

Further, if the target determined as the overhead bridge candidate continues to be detected when the target comes within a prescribed distance, the decision that the target is an overhead bridge is undone.

The method of the present invention further comprises the step of taking over previous data including a flag that is set to indicate that the target is an overhead bridge candidate.

ADVANTAGEOUS EFFECT OF THE INVENTION

According to the present invention, when the target located in the path ahead is a stationary object, as the method of the invention can identify whether the target is a vehicle stopping on the road ahead or an overhead bridge, such as a bridge, a road sign, or a billboard, located above the road ahead or on the roadside ahead, and can therefore determine whether the target is one that is to be treated as a control target in vehicle-to-vehicle control, etc., accurate vehicle control can be accomplished.

Furthermore, according to the method of the invention, the decision as to whether the target is an overhead bridge or not can be made using a simple method such as detecting the spreading of peaks having the same frequency and determining whether the position detected is at least at a prescribed distance away.

BRIEF DESCRIPTION OF THE DRAWINGS

FIG. 3 is a diagram showing how a structure is detected by the radar when the structure is a road sign located above the road ahead.

FIG. 4 is a diagram showing how a structure is detected by the radar when the structure is a bridge located above the road ahead.

FIG. 9 is a flowchart illustrating an embodiment according to the present invention.

FIG. 10 is a graph for explaining peak frequency grouping.

DETAILED DESCRIPTION OF THE INVENTION

Figure 1:
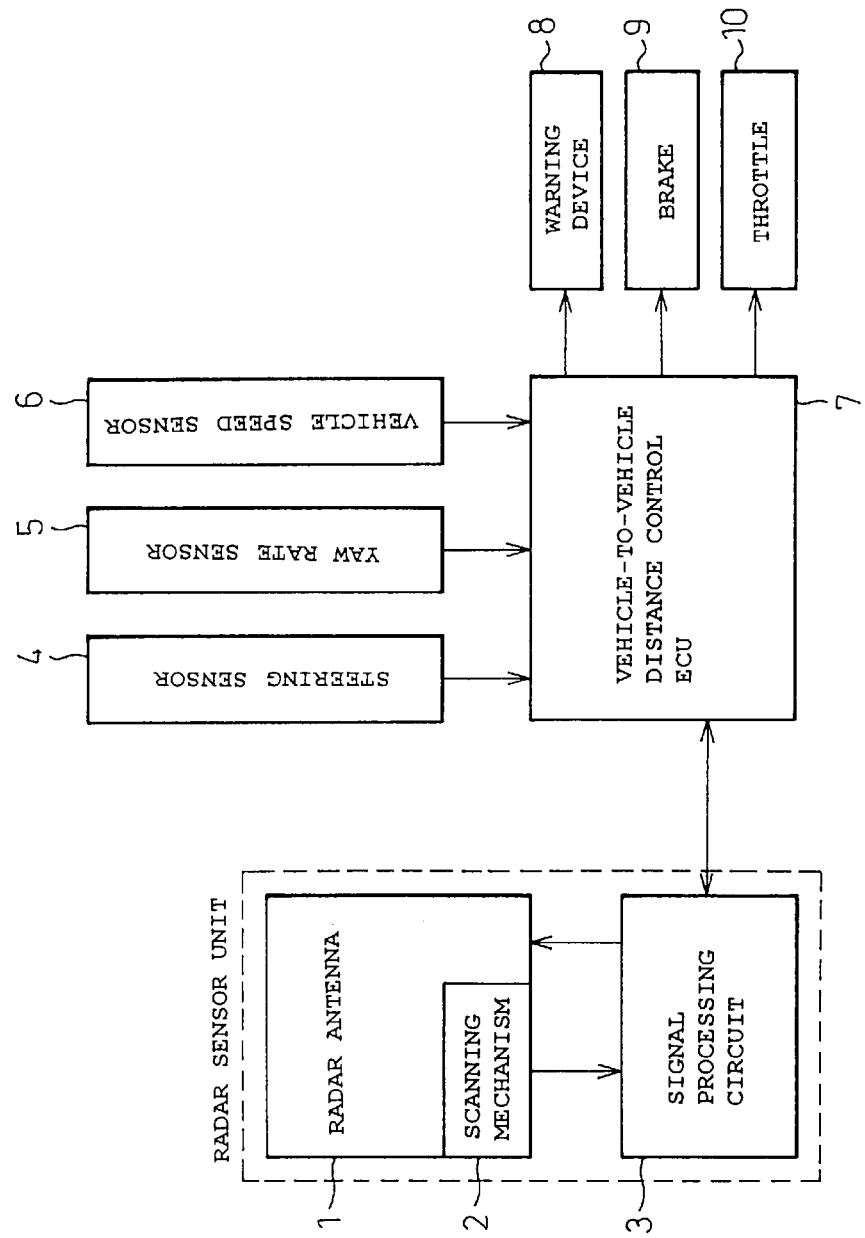
FIG. 1 is a diagram showing an overview of the configuration of a vehicle-to-vehicle control system using a scanning radar.

FIG. 1 is a diagram showing an overview of the configuration of a vehicle-to-vehicle control system using a scanning radar in which the method of the present invention is employed. A radar sensor unit is an FM-CW radar, and includes a radar antenna 1, a scanning mechanism 2, and a signal processing circuit 3. A vehicle-to-vehicle control ECU 7 receives signals from a steering sensor 4, a yaw rate sensor 5, and a vehicle speed sensor 6 as well as from the signal processing circuit 3 in the radar sensor unit, and controls a warning device 8, a brake 9, a throttle 10, etc. The vehicle-to-vehicle control ECU 7 also sends a signal to the signal processing circuit 3 in the radar sensor unit.

Figure 2:
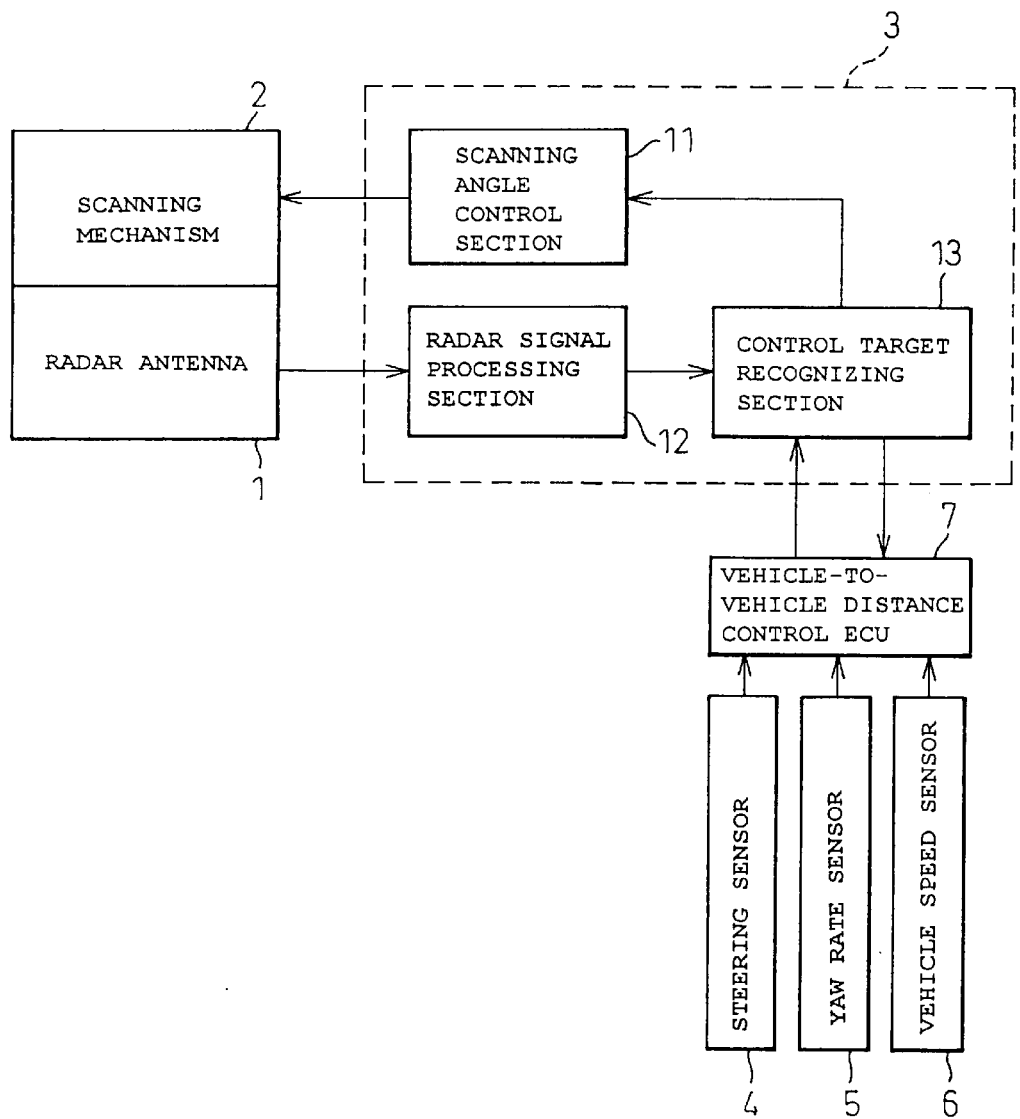
FIG. 2 is a diagram showing the configuration of a signal processing circuit 3 of FIG. 1.

FIG. 2 is a diagram showing the configuration of the signal processing circuit 3 of FIG. 1. The signal processing circuit 3 comprises a scanning angle control section 11, a radar signal processing section 12, and a control target recognizing section 13. The radar signal processing section 12 applies an FFT to the reflected signal received by the radar antenna 1, detects the power spectrum, computes the distance and relative velocity with respect to the target, and supplies the resulting data to the control target recognizing section 13. Based on the distance and relative velocity with respect to the target supplied from the radar signal processing section 12, and on vehicle information detected by the steering sensor 4, yaw rate sensor 5, vehicle speed sensor 6, etc. supplied from the vehicle-to-vehicle control ECU 7, the control target recognizing section 13 identifies the control target and supplies the result to the vehicle-to-vehicle control ECU while, at the same time, providing a commanded scanning angle to the scanning angle control section 11. The scanning angle control section 11 is one that, in the case of a fixed type radar, controls the beam projection angle, etc. when the vehicle is traveling around a corner and, in the case of a scanning radar, controls the beam scanning angle. In response to the control signal from the scanning angle control section 11, the scanning control mechanism 2 performs scanning by sequentially projecting the beam at the commanded angle.

FIG. 3 is a diagram showing how a structure is detected by the radar when the structure is, for example, a road sign located above the road ahead. In the figure, reference numeral 21 is the vehicle equipped with the radar, 22 is the radar beam projected from the radar-equipped vehicle, and 23 is the road sign as a structure located above the road ahead. As shown in FIG. 3, the vertical beam width of the antenna transmitting the radar signal is about 4.0 degrees, so that the road sign 23 located ahead of the radar-equipped vehicle is detected by the radar.

FIG. 4 is a diagram showing how a structure is detected by the radar when the structure is, for example, a bridge located above the road ahead. In the figure, reference numeral 21 is the vehicle equipped with the radar, 22 is the radar beam projected from the radar-equipped vehicle, and 24 is the bridge as a structure located above the road ahead. As shown in FIG. 4, the radar detects the bridge located ahead of the radar-equipped vehicle and cannot distinguish it from a vehicle 25 stopped on the road ahead due, for example, to a traffic jam. On the other hand, the graph shown in FIG. 4 shows how the reception level of the reflected radar signal changes with the distance from the bridge 24 to the radar-equipped vehicle 21. As shown by the graph, the reception level decreases as the vehicle approaches the bridge, since the bridge gradually goes outside the beam projection range. Though not shown in the figure, the reception level also decreases as the distance from the bridge becomes greater.

The following three points can be raised as characteristic features when an object such as a bridge or a road sign located above the road is detected.

1. The object is detected over a wide angle (because the object is wider than the vehicle and spreads horizontally above the road).

2. The relative velocity is equal to the traveling speed of the radar-equipped vehicle (because the object is stationary).

3. The object is not detected unless it is located at some distance away from the radar-equipped vehicle (for example, when the vehicle is passing below the bridge, the beam is projected in such a direction that it is not reflected from the bridge).

FM-CW radar obtains the distance to a target, i.e., a vehicle ahead, by transmitting a continuous wave frequency-modulated, for example, in a triangular pattern. More specifically, the transmitted wave from the radar is reflected by the vehicle ahead, and the reflected signal is received and mixed with the transmitted signal to produce a beat signal (radar signal). This beat signal is fast Fourier transformed to analyze the frequency. The frequency-analyzed beat signal exhibits a peak at which the power is large in relation to the target. The frequency corresponding to this peak is called the peak frequency. The peak frequency carries information concerning the distance, and the peak frequency differs between the rising portion and falling portion of the triangular FM-CW wave due to the Doppler effect associated with the relative velocity with respect to the vehicle ahead. The distance and relative velocity with respect to the vehicle ahead are determined from the peak frequencies in the rising and falling portions. If there is more than one vehicle traveling ahead, a pair of peak frequencies in the rising and falling portions is generated for each vehicle. Forming pairs of peak frequencies in the rising and falling portions is called pairing.

Figure 5A:
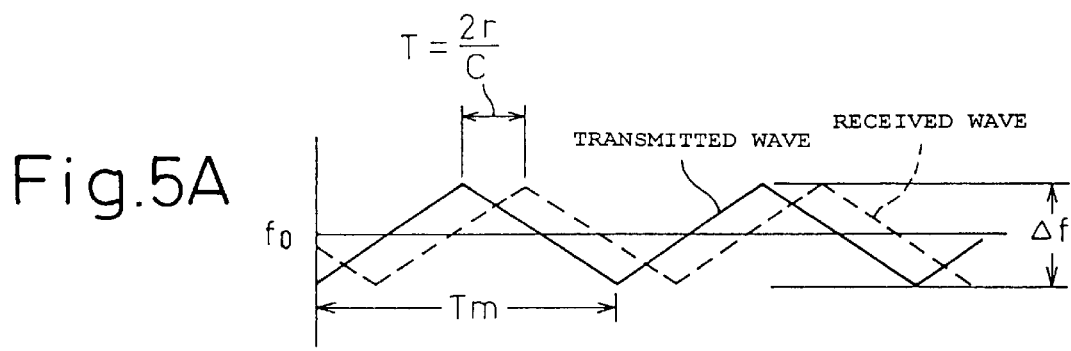
FIGS. 5A to 5C are diagrams for explaining the principle of FM-CW radar when the relative velocity with respect to target is 0.
Figure 5B:
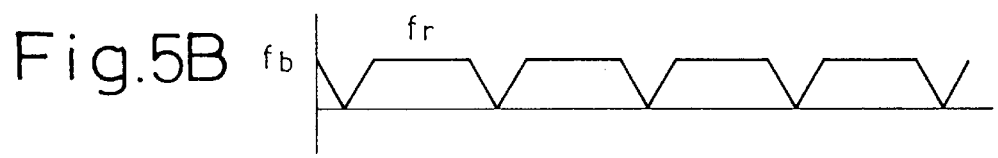
Figure 5C:
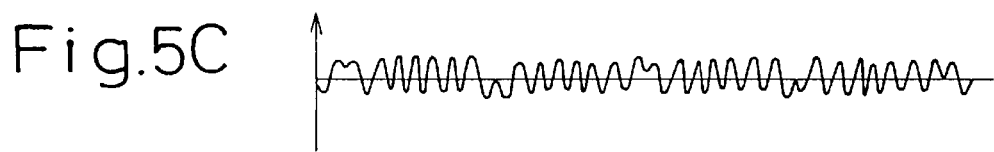

FIGS. 5A to 5C are diagrams for explaining the principle of the FM-CW radar when the relative velocity with respect to the target is 0. The transmitted wave is a triangular wave whose frequency changes as shown by a solid line in FIG. 5A. In the figure, $f_0$ is the transmit center frequency of the transmitted wave, $\Delta f$ is the FM modulation width, and Tm is the repetition period. The transmitted wave is reflected from the target and received by the antenna; the received wave is shown by a dashed line in FIG. 5A. The round trip time T to and from the target is given by $T=2r/C$, where r is the distance to the target and C is the velocity of radio wave propagation.

Here, the received wave is shifted in frequency from the transmitted signal (i.e., produces a beat) according to the distance between the radar and the target.

The beat frequency component fb can be expressed by the following equation.

$$fb = fr = (4 \cdot \Delta f / C \cdot Tm) r$$

where fr is the frequency due to the range (distance).

Figure 6A:
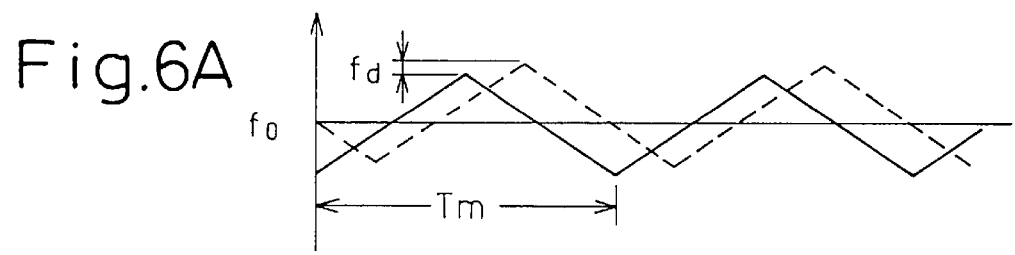
FIGS. 6A to 6C are diagrams for explaining the principle of FM-CW radar when the relative velocity with respect to target is v.
Figure 6B:
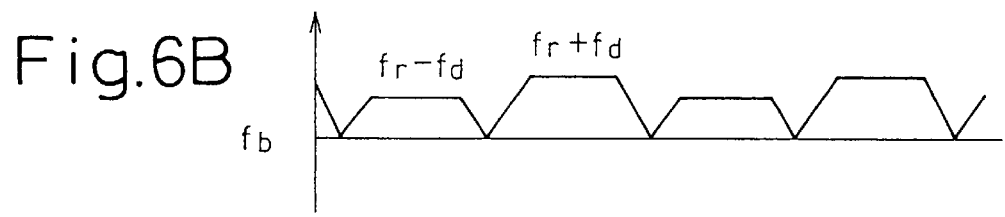
Figure 6C:
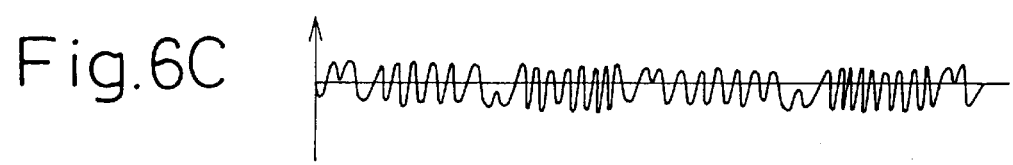

FIGS. 6A to 6C, on the other hand, are diagrams for explaining the principle of the FM-CW radar when the relative velocity with respect to the target is v. The frequency of the transmitted wave changes as shown by a solid line in FIG. 6A. The transmitted wave is reflected from the target and received by the antenna; the received wave is shown by a dashed line in FIG. 6A. Here, the received wave is shifted in frequency from the transmitted signal (i.e., produces a beat) according to the distance between the radar and the target. In this case, since the relative velocity with respect to the target is v, a Doppler shift occurs, and the beat frequency component fb can be expressed by the following equation.

$$fb=fr\pm fd=(4\cdot\Delta f/C\cdot Tm)r\pm(2\cdot f_0/C)v$$

where fr is the range frequency, and fd is the frequency due to the velocity.

Figure 7:
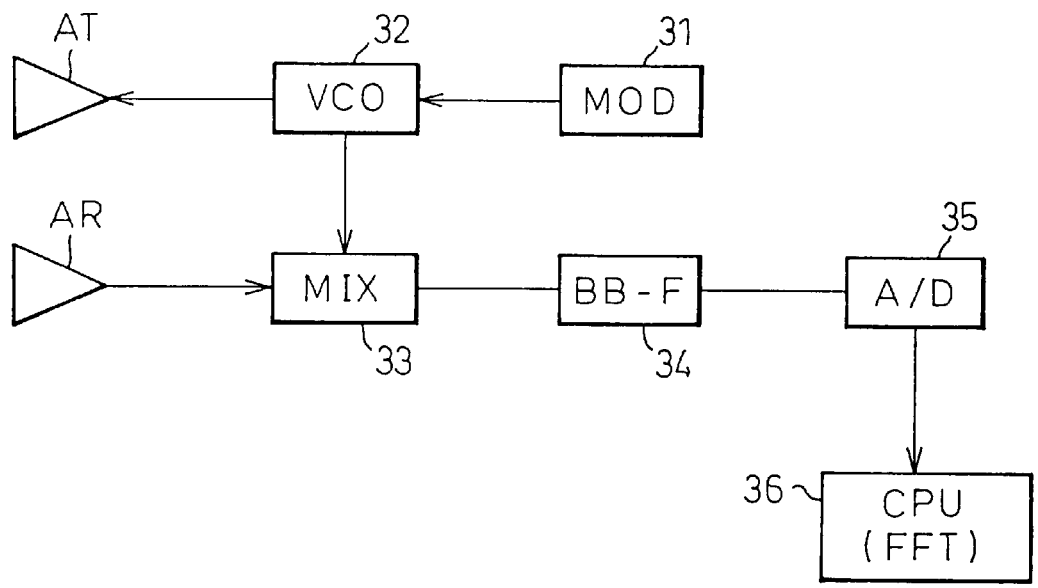
FIG. 7 is a diagram showing the configuration of a two-antenna FM-CW radar.

FIG. 7 is a diagram showing the configuration of a two-antenna FM-CW radar as one example of the FM-CW radar. As shown, a modulating signal generator 31 applies a modulating signal to a voltage-controlled oscillator 32 for frequency modulation, and the frequency-modulated wave is transmitted out via the transmitting antenna AT, while a portion of the transmitted signal is separated and directed into a frequency converter 33 which functions like a mixer. The signal reflected from a target, such as a vehicle traveling ahead, is received via the receiving antenna AR, and the received signal is mixed in the frequency converter with the output signal of the voltage-controlled oscillator 32 to produce a beat signal. The beat signal is passed through a baseband filter 34, and is converted by an A/D converter 35 into a digital signal; the digital signal is then supplied to a CPU 36 where signal processing such as fast Fourier transform is applied to the digital signal to obtain the distance and the relative velocity.

Figure 8:
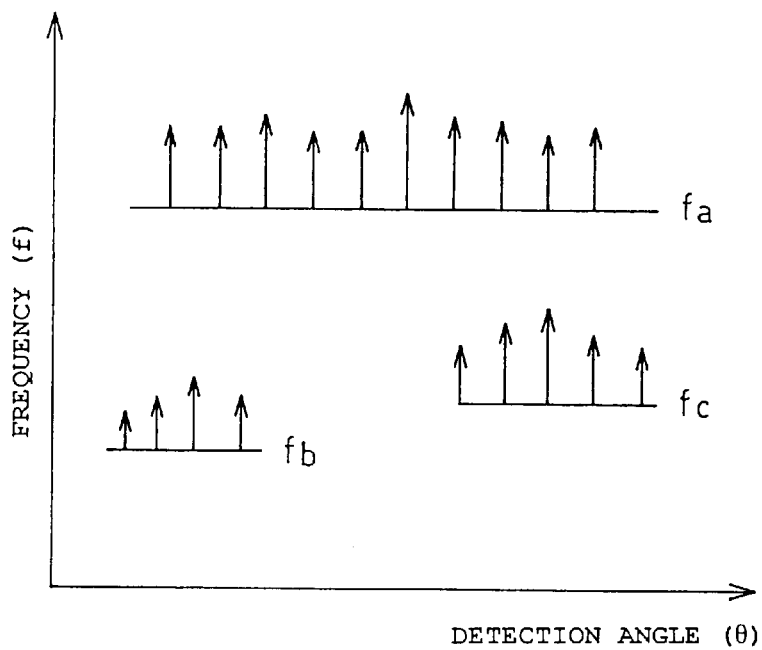
FIG. 8 is a graph showing the frequency of detected peaks in relation to detection angle.

FIG. 8 is a graph plotted with detection angle as abscissa and peak frequency as ordinate. The peaks of the same frequency are grouped together to show how their detection angles are distributed. As shown in the graph of FIG. 8, when the object is a structure such as a bridge located above the road ahead and spreading horizontally, many peaks occur as shown at the peak frequency fa, and the peaks are distributed over a wide range of detection angles. On the other hand, when the object is an ordinary vehicle, the number of peaks is relatively small as shown at the peak frequency fb or fc, and the peaks are distributed within a small range of detection angles. In this way, as the detection angle of the peak frequency greatly differs depending on the target, it is possible to identify whether the detected target is a vehicle or an overhead structure such as a bridge or the like.

FIG. 9 is a flowchart illustrating an embodiment of the method of the present invention. In the flowchart shown, decisions in the respective decision steps are made in the signal processing circuit 3 of FIG. 1.

First, in S1, peaks of the same frequency are divided into groups. For example, peaks having the same frequency are divided into groups each centered about the highest peak, as shown in FIG. 10. In the example of FIG. 10, the peaks having the same frequency fa are divided into a group g1 having a peak P1, a group g2 having a peak P2, and a group g3 having a peak P3. The peaks here need not have exactly the same frequency, but need only have substantially the same frequency. The reason is that the distance from the radar-equipped vehicle to the target, for example, a bridge, slightly differs from part to part of the bridge.

Next, in S2, a decision is made as to whether or not the frequency fa is equal to or higher than a predetermined value, that is, whether or not the distance to the target producing the peak is equal to or greater than a prescribed distance. The reason is that, in the case of a bridge or like structure located ahead, unless the structure is located at some distance away from the vehicle as shown in FIG. 4, the beam is not reflected, and therefore, the structure is not detected. If the answer to the decision is Yes, then in S3 the groups of the peaks having the same frequency are searched, that is, the groups g1, g2, and g3 are searched, to determine the total number of peaks. The above processing is performed on the peaks occurring in each of the rising and falling portions of the triangular FM-CW wave shown in FIGS. 5 and 6.

Then, in S4, a decision is made as to whether or not the number of peaks thus determined is equal to or greater than a predetermined number. As previously described, when a bridge or a road sign is detected by the radar, such an object is detected over a wide angle. That is, the number of reflected beams increases, increasing the number of peaks detected. Therefore, when the number of peaks is large, for example, not smaller than 10 (Yes), an overhead bridge candidate flag is set in S5. This flag, when set, indicates that the detected object is a candidate for an overhead structure such as a bridge, a road sign, a billboard, etc. located above the road ahead. In this case, a road sign on the roadside ahead, for example, is also detected, and in this case also, when the above condition is satisfied, the flag is set. Accordingly, the term "overhead bridge" used in this invention refers to a stationary object such as a bridge, a road sign, a billboard, etc. located above the road ahead or on the roadside.

Here, when it is decided in step S4 that the number of peaks determined is equal to/greater than the predetermined number, it is also possible to determine the target as an overhead bridge.

Next, the process proceeds to S6 where the pairing is performed. When the answer to the decision in S2 or S4 is No, the process also proceeds to the pairing step.

In the pairing step of S6, the distance to the target determined as the overhead bridge candidate, the relative velocity of the radar-equipped vehicle with respect to the target, and the detection angle are computed from the peak frequencies in the rising and falling portions of the triangular wave.

Next, in S7, previous data is taken over. That is, data concerning the target determined as an overhead bridge candidate in the previous cycle of processing, such as the distance and relative velocity with respect to the target, is taken over. For example, there are cases where an overhead bridge candidate was detected in the previous cycle but the target detected in the current cycle does not necessarily satisfy the overhead bridge condition. To provide for such cases, if the distance of the currently detected target is close to the distance of the previously detected overhead bridge candidate, for example, the previously detected overhead bridge candidate is taken over.

Then, a decision is made in S8 as to whether the overhead bridge candidate is a stationary object or not. This decision is made, for example, in the following manner. First, assuming that the radar-equipped vehicle is traveling, for example, at a speed of 30 km/h or higher, if the relative velocity is substantially equal to the traveling speed of the vehicle, it is decided that the overhead bridge candidate is a stationary object. More specifically, when the vehicle is traveling at 80 km/h, for example, if the target is stationary, the relative velocity is −80 km/h; accordingly, if |(relative velocity)−(vehicle speed)|≦10 km/h, it is decided that the overhead bridge candidate is a stationary object. Here, the condition is chosen to be "not greater than 10 km/h", not "0 km/h", to take account of an error, etc. At this stage, the overhead bridge candidate may be determined as an overhead bridge.

If the answer to the decision in S8 is Yes, then in S9 a decision is made as to whether or not the distance to the target is equal to or greater than a predetermined value. As previously described, if the object is an overhead bridge, the beam does not strike the object unless the object is located at least at a prescribed distance away from the radar-equipped vehicle; therefore, if the distance to the target is smaller than the predetermined value, it can be determined that the target is not an overhead bridge. For example, if the distance to the target determined as an overhead bridge is not smaller than 50 m, it is determined that the target is located at the prescribed distance away. However, if the target continues to be detected when the target comes within the prescribed distance, the overhead bridge decision is undone in S12, because the target may be a vehicle or the like stationary on the road ahead.

The process proceeds to S10 where a decision is made as to whether the overhead bridge candidate flag is set or not. If the answer is Yes, it is decided in S11 that the target is an overhead bridge. On the other hand, if the answer to the decision in S8 or S10 is No, the flow is terminated.

What is claimed is:

1. A stationary object detection method for a scanning radar that performs scanning along a radar beam projection direction wherein, of peaks generated based on a radar signal reflected from a target, peaks having substantially the same frequency are grouped together, and a decision is made as to whether or not the frequency of said grouped peaks is equal to or higher than a predetermined value, and wherein if said peak frequency is equal to or higher than said predetermined value, then a decision is made as to whether or not the number of said grouped peaks is equal to or greater than a predetermined number and, if the number of said peaks is equal to or greater than said predetermined number, it is decided that said target is an overhead bridge candidate or an overhead bridge.

2. A stationary object detection method for a scanning radar as claimed in claim 1, wherein pairing is applied to peaks signals obtained from said target determined as said overhead bridge candidate, to detect a relative velocity with respect to said target, and if said relative velocity is substantially equal to the speed of a vehicle equipped with said radar, it is decided that said target is an overhead bridge.

3. A stationary object detection method for a scanning radar as claimed in claim 1 or 2, wherein if said target determined as said overhead bridge candidate continues to be detected when said target comes within a prescribed distance, the decision that said target is an overhead bridge is undone.

4. A stationary object detection method for a scanning radar as claimed in claim 1 or 2, comprising the step of taking over previous data including a flag that is set to indicate that said target is said overhead bridge candidate.

5. A stationary object detection method for a scanning radar as claimed in claim 1 or 2, wherein said overhead bridge is one or more of the group a bridge, a road sign, and a billboard, located above a road or on a roadside.

* * * * *